A. J. STEWART,

Assignor to C. La Dow, said La Dow assignor of one-half to Wheeler & Melick Co.

HARROW.

No. 10,041. Reissued Feb. 21, 1882.

WITNESSES

Wm. A. Skinkle

Jos. S. Lakemer

Charles La Dow, Assignee of INVENTOR

Adoniram J. Stewart

By his Attorneys

Baldwin, Hopkins & Peyton.

UNITED STATES PATENT OFFICE.

ADONIRAM J. STEWART, OF CHILLICOTHE, MISSOURI, ASSIGNOR TO CHARLES LA DOW, OF ALBANY, NEW YORK; SAID LA DOW ASSIGNOR OF ONE-HALF TO WHEELER & MELICK COMPANY, OF ALBANY, NEW YORK.

HARROW.

SPECIFICATION forming part of Reissued Letters Patent No. 10,041, dated February 21, 1882.

Original No. 144,236, dated November 4, 1873. Application for reissue filed November 21, 1881.

*To all whom it may concern:*

Be it known that I, ADONIRAM J. STEWART, of Chillicothe, Missouri, have made and invented a new and useful Improvement in Harrows, of which the following is a specification.

My invention relates to an improvement in harrows; and it consists of series of spring-teeth supported in bearings in the beams of a harrow-frame, the object being to provide an efficient means of adjusting the teeth to any requisite angle.

Another object of my invention is to provide means whereby all the series of spring-teeth can be adjusted at one time and to the same angle.

Figure 1:
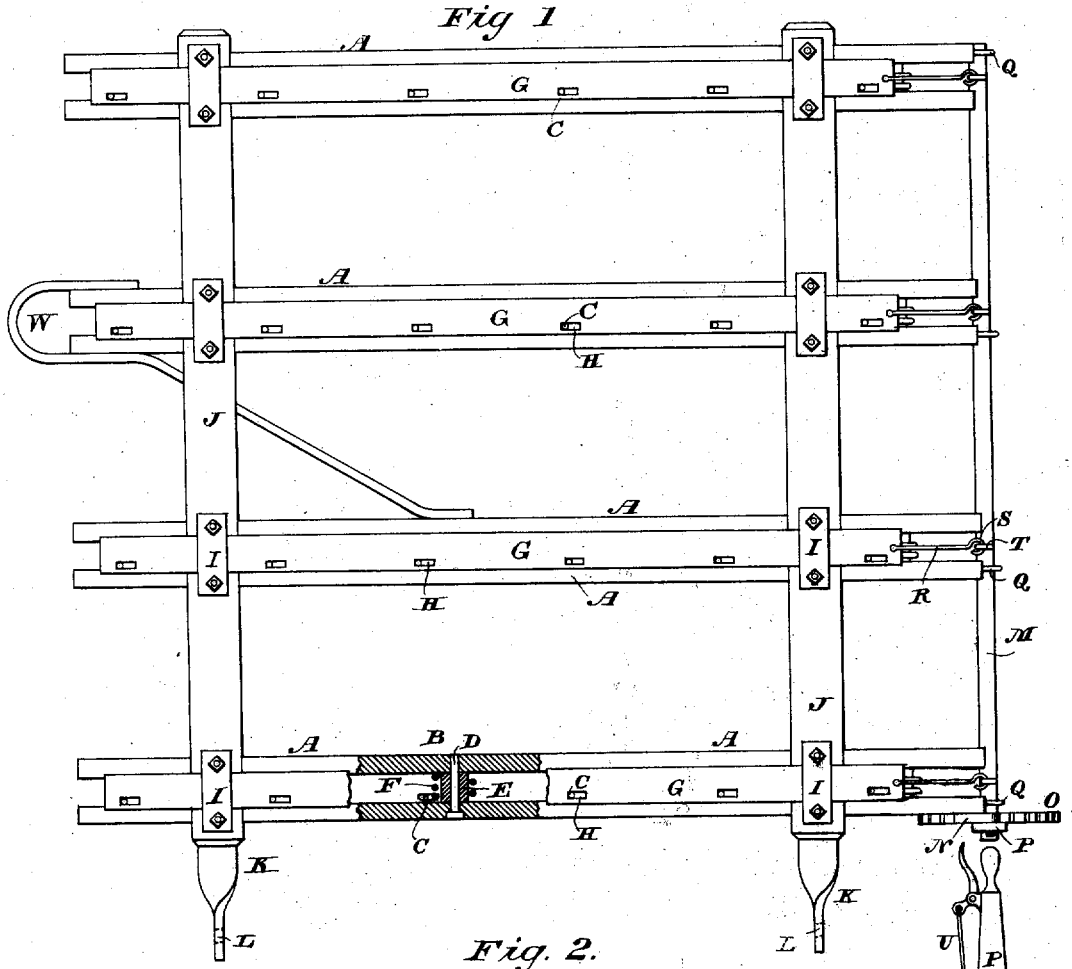
Figure 2:
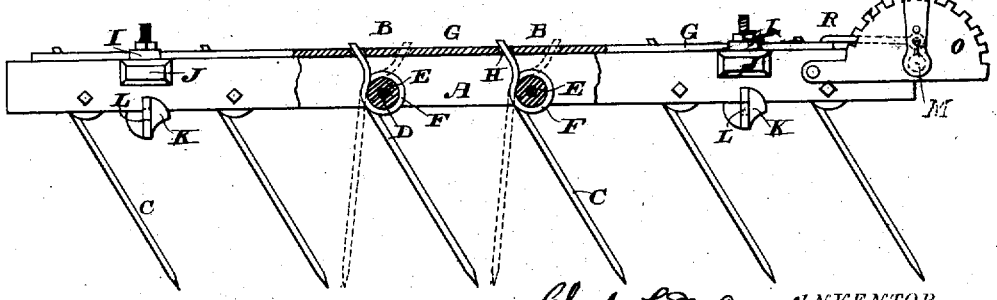

Figure 1 is a plan view of a device embodying the elements of the invention. Fig. 2 is a side elevation of the same, certain parts broken out to disclose the internal arrangement.

In the accompanying drawings, the longitudinal beams of the frame are composed of two light beams, A A, between which the bearings B of the spring-teeth C are inserted. The bearings B are composed of a short shaft, D, on which a spool, E, is placed. The teeth C are of round spring-steel coiled to encircle the bearings B, and to extend both above and below the coil F. The slides G have perforations H large enough to receive the ends of the teeth C at a distance from each other equal to the distance between the diametrical centers of the bearings B. The slides G extend nearly the entire length of the longitudinal beams, and are sufficiently wide to cover the spaces between the beams A A. They work in the ways I, secured to the cross-beams J J, which are let into the longitudinal beams. Iron straps K, twisted and provided with holes L at one end, traverse the under side of the frame beneath and parallel with cross-beams J J, and are used for coupling the sections of the harrow together. A rock-shaft, M, provided with a pawl, N, ratchet O, and lever P, traverses the rear end of the frame in suitable bearings, Q, and is connected to the slides G by hooked rods R, linked to the shaft by eyes S and T. The lever P and pawl N are connected by a rod, U, provided with a spiral spring, V, which holds the pawl N in the teeth of the ratchet O, except when it is manually withdrawn by the rod and lever. W is the clevis.

The operation of the harrow is as follows: When one of the teeth strikes an obstruction it will rebound and pass over the obstruction without raising the other teeth. The lever P, when drawn forward, throws the points of the teeth backward, and this operation is performed when it is desired to clear the teeth of rubbish without stopping the team. The capability of being adjusted to any desired angle adapts it to use for different kinds of work, such as pulverizing, smoothing, covering grain, or harrowing corn. To pass over a corn-row, if it should be necessary, a portion of the teeth can be withdrawn from the slide. To move it from field to field the points of the teeth should be thrown back as far as they will go. The harrow will then pass over a road or meadow without danger to the harrow, meadow, or road.

I am aware that heretofore harrows and cultivators have been made with series of rigid teeth which could be adjusted at different angles; also, that harrows and cultivators have been made with series of teeth which did not support the frame, but which were rendered somewhat elastic by means of auxiliary springs; also, that hay-rakes have been made with a single series of spring-teeth which could be adjusted at different angles, and I do not claim such contrivances; but What I do claim is—

1. In a harrow, the combination of a frame, two or more series of adjustable teeth which are springs within themselves and which act in concert on the soil, one tooth being capable of passing an obstruction without raising the other teeth, and mechanism for holding the teeth at the angle adjusted.

2. In a harrow, the combination of a frame, two or more series or rows of teeth which are springs within themselves and which act in concert on the soil, one tooth being capable of passing an obstruction without raising the other teeth, and lever mechanism for simultaneously varying the angle of the different series of teeth and holding them in their adjusted position.

3. A harrow-frame having sections and teeth which are adjustable at different angles and able to rebound independently when passing obstructions.

4. In a harrow, the combination of a frame, digging points or teeth which support the frame, arranged in two or more series or rows, and coil-springs which encircle the bearings of and coact with the teeth.

5. In a harrow, the combination of a frame, digging points or teeth arranged in series or multiple rows and supporting the frame, and coil-springs which connect the teeth directly to the frame.

6. In a harrow, the combination of a frame with two or more series of spring-teeth vibrating independently thereon and capable of being angularly adjusted, said teeth being arranged between opposing parts of said frame for the purpose of securing the teeth to their bearings and regulating their angle and vibration.

7. The spring-harrow teeth C, supported on bearings in the beams A, in combination with the slides G, operated by the rock-shaft M, provided with lever P, ratchet O, and pawl N.

ADONIRAM J. STEWART.

Witnesses:
J. C. ENGLAND,
JOHN LA DOW.